UNITED STATES PATENT OFFICE.

GEORGE ARCHBOLD, OF OSWEGO, NEW YORK.

MANUFACTURE OF PAPER-PULP.

SPECIFICATION forming part of Letters Patent No. 274,250, dated March 20, 1883.

Application filed January 26, 1883. (No specimens.)

*To all whom it may concern:*

Be it known that I, GEORGE ARCHBOLD, of Oswego, in the county of Oswego, in the State of New York, have invented new and useful Improvements in the Manufacture of Paper-Pulp, of which the following is a full, clear, and exact description.

This invention relates to the treatment of wood, straw, rags, or any other substance of a cellulose or fibrous nature in the process of converting the same into paper-pulp.

My invention consists in a novel process of producing from the aforesaid substances paper-pulp of superior quality.

The following directions will enable those skilled in the art to avail themselves of my invention:

First. Treat the cellulose or fibrous material with diluted milk of lime, (one (1) per cent. milk of lime and ninety-nine (99) per cent. of water.) The proportions, however, will vary according to the structure of the tissue of the substance used, and in some substances—such as hard wood—use one (1) per cent. of nitrate of lime with the milk of lime used.

Second. Pass in sulphurous-acid gas immediately. This produces in the fiber itself acid sulphite of lime, (and is ascertained by turning blue litmus-paper red,) and also produces, to use the parlance of paper-factories, "one-half (½) stuff" in about five (5) minutes in ordinary cases.

Third. Then subject to steam-pressure of from four (4) to five (5) atmospheres for one (1) hour, more or less, according to nature of product. This product is pure cellulose.

Fourth. Afterward wash out chemicals with water. This leaves the fiber resembling cotton-wool.

If bleaching should be necessary, as it may be in case certain substances are used, the process is as follows, viz: Use for every hundred (100) pounds three (3) pounds chloride of lime and one (1) ounce acid sulphate of alumina. Dissolve the acid sulphate of alumina in water and add it to the mixture of chloride of lime and water and mix with the pulp. These chemicals may be washed out afterward.

Having described my invention, what I claim as new, and desire to secure by Letters Patent, is—

The process of manufacting paper-pulp from wood, straw, or other cellulose or fibrous substances by first treating said substances with milk of lime, then passing in sulphurous-acid gas, then subjecting it to steam-pressure, and then washing out of it the chemicals, substantially as described.

In testimony whereof I have hereunto signed my name and affixed my seal, in the presence of two attesting witnesses, at Oswego, in the county of Oswego, in the State of New York, this 18th day of January, 1883.

GEORGE ARCHBOLD. [L. S.]

Witnesses:
GEO. N. BURT,
C. M. BURT.